B. F. WHITNER.
Seed Planter.
No. 76,865. Patented April 14, 1868
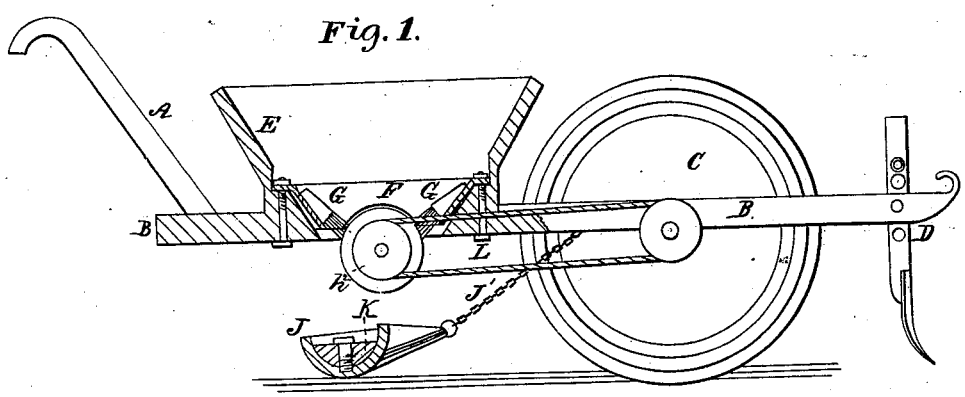
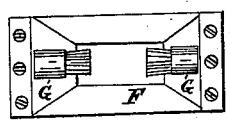
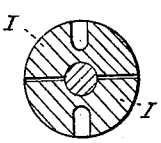
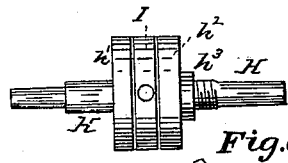
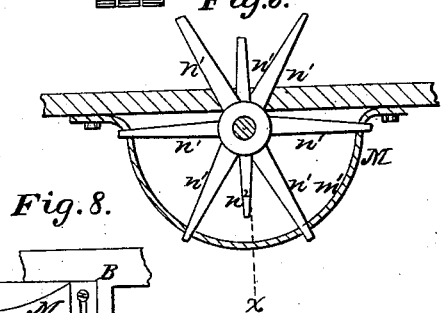
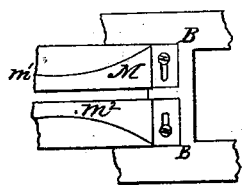
Witnesses:
Theo Tuschel
J. A. Fraser
Inventor:
B. F. Whitner
Per Munn &
Attorneys

United States Patent Office.

BENJAMIN F. WHITNER, OF MADISON, FLORIDA.

Letters Patent No. 76,865, dated April 14, 1868.

IMPROVEMENT IN COMBINED PLANTERS AND MANURE-DISTRIBUTERS.

*The Schedule referred to in these Letters Patent and making part of the same.*

TO ALL WHOM IT MAY CONCERN:

Be it known that I, BENJAMIN F. WHITNER, of Madison, in the county of Madison, and State of Florida, have invented a new and improved Planter and Manure-Distributer; and I do hereby declare that the following is a full, clear, and exact description thereof, which will enable others skilled in the art to make and use the same, reference being had to the accompanying drawings, forming part of this specification.

Figure 1 is a side view of my improved machine, part being broken away to show the construction.
Figure 2 is a detail top view of the hopper for dropping seed.
Figure 3 is a detail top view of the covering-drag.
Figure 4 is a detail view of the adjustable dropping-cylinder.
Figure 5 is a detail sectional view of the same.
Figure 6 is a detail sectional view of the discharging-hopper.
Figure 7 is a detail cross-section of the same, taken through the line $x$, fig. 6.
Figure 8 is a detail bottom view of one end of the same.

Similar letters of reference indicate corresponding parts.

My invention has for its object to improve the construction of my planter and manure-distributer, patented May 21, 1867, and numbered 64,926, so as to make it more convenient and effective in operation, and so as to adapt it to planting short cotton; and it consists in the construction of the dropping-cylinder, in the combination of a removable weight with the covering-drag, and in the construction of the parts for dropping the cotton-seed, the whole being constructed and arranged as hereinafter more fully described.

A are the handles, B is the frame, C is the furrow-wheel, and D is the adjustable furrowing-plough, about the construction of which parts there is nothing new. E is a large seed-hopper, which is permanently attached to the frame B. F is a removable hopper for dropping seeds, which is fitted into the lower part of the hopper E, and which is secured in place, when adjusted, by bolts passing down through the shoulders of the hopper E, and through the frame B. The hopper F is adjusted by set-screws passing through its ends, and the ends of which rest against the shoulders of the hopper E.

G are brushes, which are adjustably attached to the ends of the hopper F, so as to prevent the escape of any more than the desired amount of seed.

H is the dropping-cylinder, which revolves in bearings attached to the under side of the frame B, in such a position that the lower edge of the hopper F may fit upon the said cylinder. The cylinder H is formed with two flanges, $h^1$ and $h^2$, between which is placed the recessed ring I. One of the flanges, $h^1$, is formed solidly upon the cylinder H, and the other, $h^2$, is movable, being held in place, clamping the recessed ring between the said flanges $h^1 h^2$, by the nut $h^3$, screwing upon a screw-thread cut upon the shaft or cylinder H, as shown in fig. 4. The ring I is made in two parts, for convenience in attaching and removing it. The face of the ring I is recessed, as shown in figs. 4 and 5, according to the size of the seed to be planted, and the quantity to be dropped in each hill. This renders it necessary that as many rings should be used as different kinds of seeds are to be planted.

J is the covering-drag, which is made in the form shown in figs. 1 and 3. The drag J is connected to the frame B by the chains $j$, and is dragged along the ground in the rear of the hoppers. The drag J rests upon its middle part, and as it is drawn forward it forces the soil back into the open furrow, covering the seed, and leaving the ground smoothly levelled off.

K is a weight so formed as to fit the upper side of the drag J. In smooth, light soils, the weight K will not be required, but, where the ground is rough, a better result is obtained by attaching the weight K, which is secured in place by a screw or screws, as shown in figs. 1 and 3.

When the machine is to be used for dropping short or upland-cotton seed, the hopper F and the cylinder H are removed.

M is the cotton-seed-discharging hopper, which is made in two parts, $m^1 m^2$, and is adjustably attached to the under side of the frame B, by screws which pass through slots in the ends of the said parts, and screw into the said frame B. This enables the parts $m^1$ and $m^2$ to be moved farther apart or nearer together, according to the amount of seed desired to be dropped.

N is a shaft revolving in bearings attached to the under side of the frame B, and having a circle or series of radial arms, $n^1$, formed upon or attached to its central part, which said arms should be of such a length as to just reach through the opening or slot between the parts $m^1$ $m^2$ of the hopper M. The cylinder or shaft N has also one or more arms, $n^2$, attached to it, upon each side of the radial arms $n^1$, but shorter than said arms, so as to work within the hopper M, and keep the seed stirred up, at the same time working it down constantly towards the discharging-slot or opening, so that it may be pushed out by the arms $n^1$. The cylinders H have a pulley or pulleys attached to one or both their ends, around which, and around the pulley or pulleys attached to the end or ends of the shaft of the furrow-wheel C, passes a band or chain L, so that the said cylinders may be operated by the advance of the machine.

I claim as new, and desire to secure by Letters Patent—

1. Making one of the flanges, $h^2$, of the cylinder H movable, and securing it in place, clamping the jointed recessed ring I, between it and the stationary flange $h'$, by means of the nut J, screwing upon the said cylinder H, substantially as herein shown and described, and for the purpose set forth.

2. Adjustably securing the hopper F in place within the hopper E, by means of bolts and set-screws, substantially as herein shown and described, and for the purpose set forth.

3. The combination of a removable weight, K, with the covering-drag J, substantially as herein shown and described, and for the purpose set forth.

4. The discharging-hopper M, constructed in two parts, in substantially the form herein shown and described, and adjustably secured to the under side of the frame B, as and for the purpose set forth.

5. The stirrer-shaft or cylinder N, having radial arms, $n^1$, and side-arms, $n^2$, attached to or formed upon it, in combination with the peculiarly-shaped hopper M, and with the frame B, substantially as herein shown and described, and for the purpose set forth.

The above specification of my invention signed by me, this 2d day of November, 1867

B. F. WHITNER.

Witnesses:
WM. F. McNAMARA,
JAMES T. GRAMAM.